(12) United States Patent
Palfai et al.

(10) Patent No.: US 8,591,369 B2
(45) Date of Patent: Nov. 26, 2013

(54) ASYNCHRONOUS BOOST ASSIST SYSTEM FOR A MOTOR VEHICLE

(75) Inventors: Balazs Palfai, Fishers, IN (US); Alex Creviston, Muncie, IN (US); Attila Nagy, Fishers, IN (US); Gurkamal Singh, Pittsford, NY (US)

(73) Assignee: Remy Technologies, L.L.C., Pendleton, IN (US)

( * ) Notice: Subject to any disclaimer, the term of this patent is extended or adjusted under 35 U.S.C. 154(b) by 338 days.

(21) Appl. No.: 13/081,191

(22) Filed: Apr. 6, 2011

(65) Prior Publication Data

US 2012/0258833 A1    Oct. 11, 2012

(51) Int. Cl.
*F16H 48/30* (2012.01)
*F16H 3/72* (2006.01)
*F16H 37/06* (2006.01)
*B60K 1/00* (2006.01)
*B60K 6/445* (2007.10)
*B60W 10/04* (2006.01)
*B60W 20/00* (2006.01)

(52) U.S. Cl.
USPC ............ 475/150; 475/2; 475/5; 475/6; 475/9; 180/65.235; 180/65.285; 180/65.6

(58) Field of Classification Search
USPC ............ 475/1–10; 180/65.1, 65.235, 65.285, 180/65.6
See application file for complete search history.

(56) References Cited

U.S. PATENT DOCUMENTS

| | | | |
|---|---|---|---|
| 4,734,626 A | 3/1988 | Sutrina et al. | |
| 6,098,737 A * | 8/2000 | Aoki | 180/242 |
| 7,056,252 B2 * | 6/2006 | Gumpoltsberger et al. | 475/6 |
| 8,012,057 B2 * | 9/2011 | Meixner | 475/6 |
| 2007/0213166 A1 | 9/2007 | Gassmann | |
| 2011/0245007 A1 * | 10/2011 | Yoshimura | 475/150 |

* cited by examiner

*Primary Examiner* — Tisha Lewis
(74) *Attorney, Agent, or Firm* — Cantor Colburn LLP

(57) ABSTRACT

An asynchronous boost assist system for a motor vehicle includes a first electric motor, a second electric motor positioned opposite the first electric motor and a differential gear system operatively connected to the first and second electric motors. The differential gear system includes a first differential gear set and a second differential gear set. The first differential gear set is operatively connected to the first and second electric motors and the second differential gear set is configured and disposed to operatively connect to first and second vehicle wheels. A controller is operatively connected to each of the first and second electric motors. The controller selectively independently controls an operational speed of each of the first and second electric motors to selectively provide an acceleration boost through the second differential gear set.

18 Claims, 8 Drawing Sheets

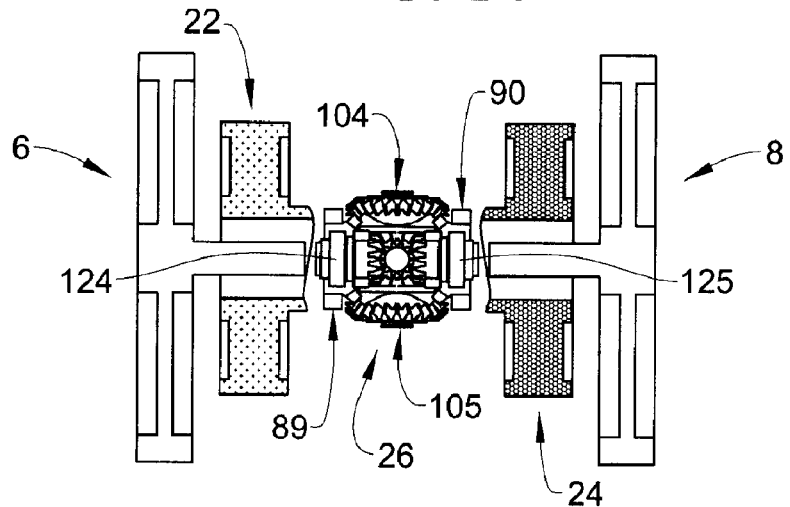
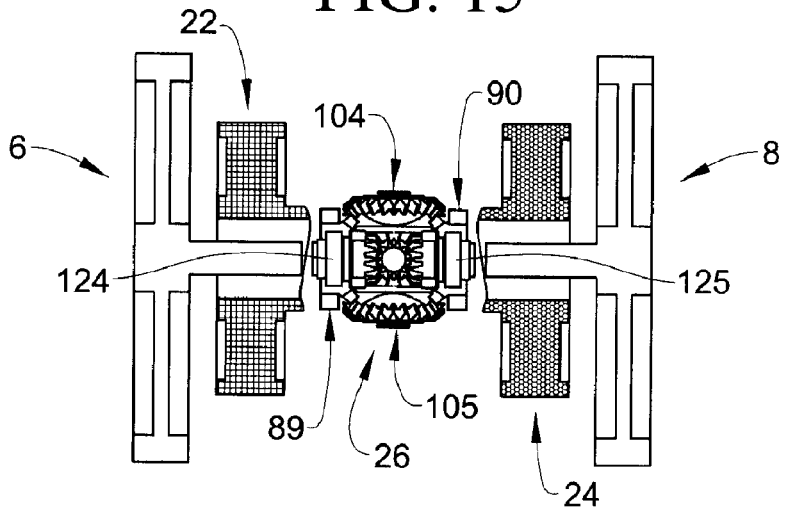
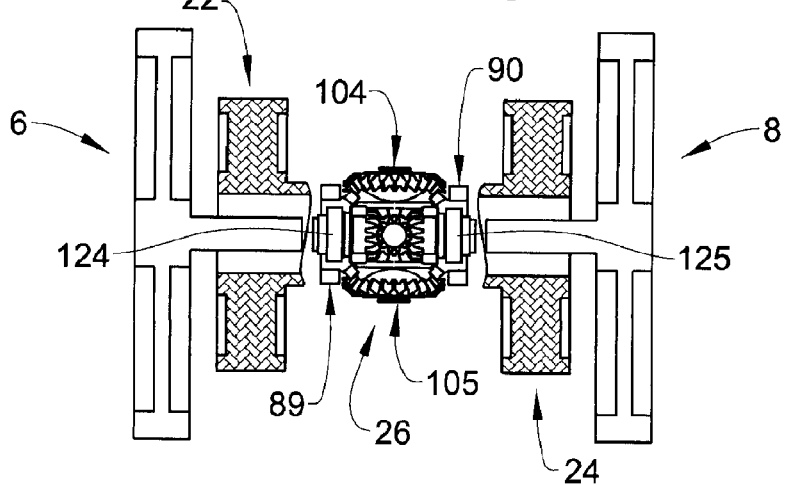

ASYNCHRONOUS BOOST ASSIST SYSTEM FOR A MOTOR VEHICLE

BACKGROUND OF THE INVENTION

Exemplary embodiments pertain to the art of motor vehicles and, more particularly, to an asynchronous boost assist system for a motor vehicle.

The use of electric power for motor vehicles is gaining prominence. Manufacturers currently offer motor vehicles that employ an electric motor in combination with a fossil fuel motor (Hybrid Vehicle) or motor vehicles that rely entirely on electric power as a source of motive energy. Vehicles that incorporate electric motors are growing in popularity among consumers desiring to be more "green' and/or those who desire to save on fuel costs. However, many consumers feel that electric and hybrid electric vehicles lack certain desirable performance characteristics. Electric motors possess acceleration curves that are more gradual than motors powered by fossil fuels. Accordingly, electric and hybrid electric vehicles lack off-the-line performance. In addition, passing performance, or acceleration from cruising speed to pass another vehicle, is also more gradual than is preferred by many consumers.

BRIEF DESCRIPTION OF THE INVENTION

Disclosed is an asynchronous boost assist system for a motor vehicle. The boost assist system includes a first electric motor, a second electric motor positioned opposite the first electric motor and a differential gear system operatively connected to the first and second electric motors. The differential gear system includes a first differential gear set and a second differential gear set. The first differential gear set is operatively connected to the first and second electric motors and the second differential gear set is configured and disposed to operatively connect to first and second vehicle wheels. A controller is operatively connected to each of the first and second electric motors. The controller selectively independently controls an operational speed of each of the first and second electric motors to selectively provide an acceleration boost through the second differential gear set.

Also disclosed is a vehicle including a chassis, and a plurality of wheels mounted to the chassis. The plurality of wheels include first and second front vehicle wheels and first and second rear vehicle wheels. An asynchronous boost assist system is mounted in the chassis. The asynchronous boost system includes a first electric motor, a second electric motor positioned opposite the first electric motor, and a differential gear system operatively connected to the first and second electric motors. The differential gear system includes a first differential gear set operatively coupled to the first and second output members and a second differential gear set operatively connected to one of the first and second front vehicle wheels and the first and second rear vehicle wheels. A controller is operatively connected to each of the first and second electric motors. The controller selectively independently controls an operational speed of each of the first and second electric motors to selectively provide an acceleration boost through the second differential gear set.

Further disclosed is a method of operating a boost assist system for a vehicle. The method includes signaling a first electric motor to rotate in a first direction at a first operational speed, signaling a second electric motor, operatively connected to the first electric motor through a differential gear set, to rotate in a second direction at the first operational speed, and reducing the first operational speed of the first electric motor to initiate forward movement of a vehicle.

BRIEF DESCRIPTION OF THE DRAWINGS

The following descriptions should not be considered limiting in any way. With reference to the accompanying drawings, like elements are numbered alike:

FIG. 14 depicts the first electric motor going to a zero speed with the second electric motor remaining at full speed as the vehicle continues to accelerate;

FIG. 15 depicts the first electric motor initiating rotation in the second direction as the vehicle continues to further accelerate; and FIG. 16 depicts the first electric motor operating at a first, less than full, speed in the second direction, and a reduction from full speed in the second direction to the first, less than full, speed of the second electric motor to establish a balanced cruising speed of the vehicle

DETAILED DESCRIPTION OF THE INVENTION

A detailed description of one or more embodiments of the disclosed apparatus and method are presented herein by way of exemplification and not limitation with reference to the Figures.

Figure 1:
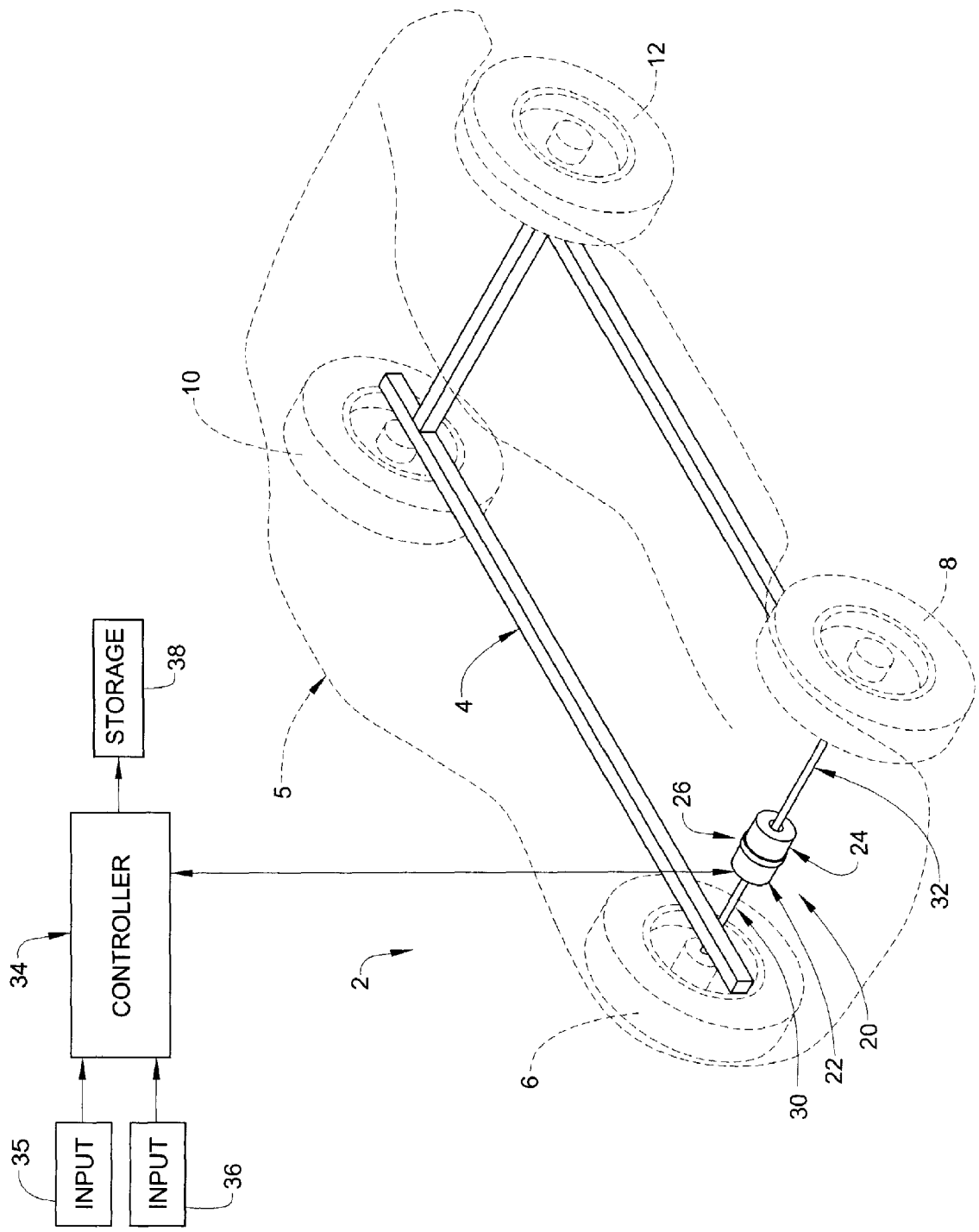
FIG. 1 depicts a motor vehicle including an asynchronous boost assist system in accordance with an exemplary embodiment.

With reference to FIG. 1, a motor vehicle in accordance with an exemplary embodiment is illustrated generally at 2. While shown as including front wheel drive, it should be understood that motor vehicle 2 could also be configured with rear wheel or all-wheel drive. Motor vehicle 2 includes a chassis 4 that supports a vehicle body 5 as well as first and second front wheels 6 and 8, and first and second rear wheels 10 and 12. In accordance with an exemplary embodiment, motor vehicle 2 includes an asynchronous boost assist system 20 that provides motive force to first and second front wheels 6 and 8. Asynchronous boost assist system 20 includes a first electric motor 22 operatively connected to a second electric motor 24 through a differential gear system 26. A first drive shaft 30 operatively connects asynchronous boost assist system 20 to first front wheel 6 and a second drive shaft 32 operatively couples asynchronous boost assist system 20 to second front wheel 8.

In further accordance with the exemplary embodiment, asynchronous boost assist system 20 is electrically coupled to a controller 34. Controller 34 receives inputs from a first sensor 35, such as an accelerator and a second sensor 36, such as a speed sensor, to independently control operational speed and rotational direction of first and second electric motors 22 and 24. Controller 34 is also coupled to an energy storage system 38 that receives electrical energy generated by first and/or second electric motors 22 and 24 during various operational conditions of motor vehicle 2 as will be discussed more fully below.

Figure 2:
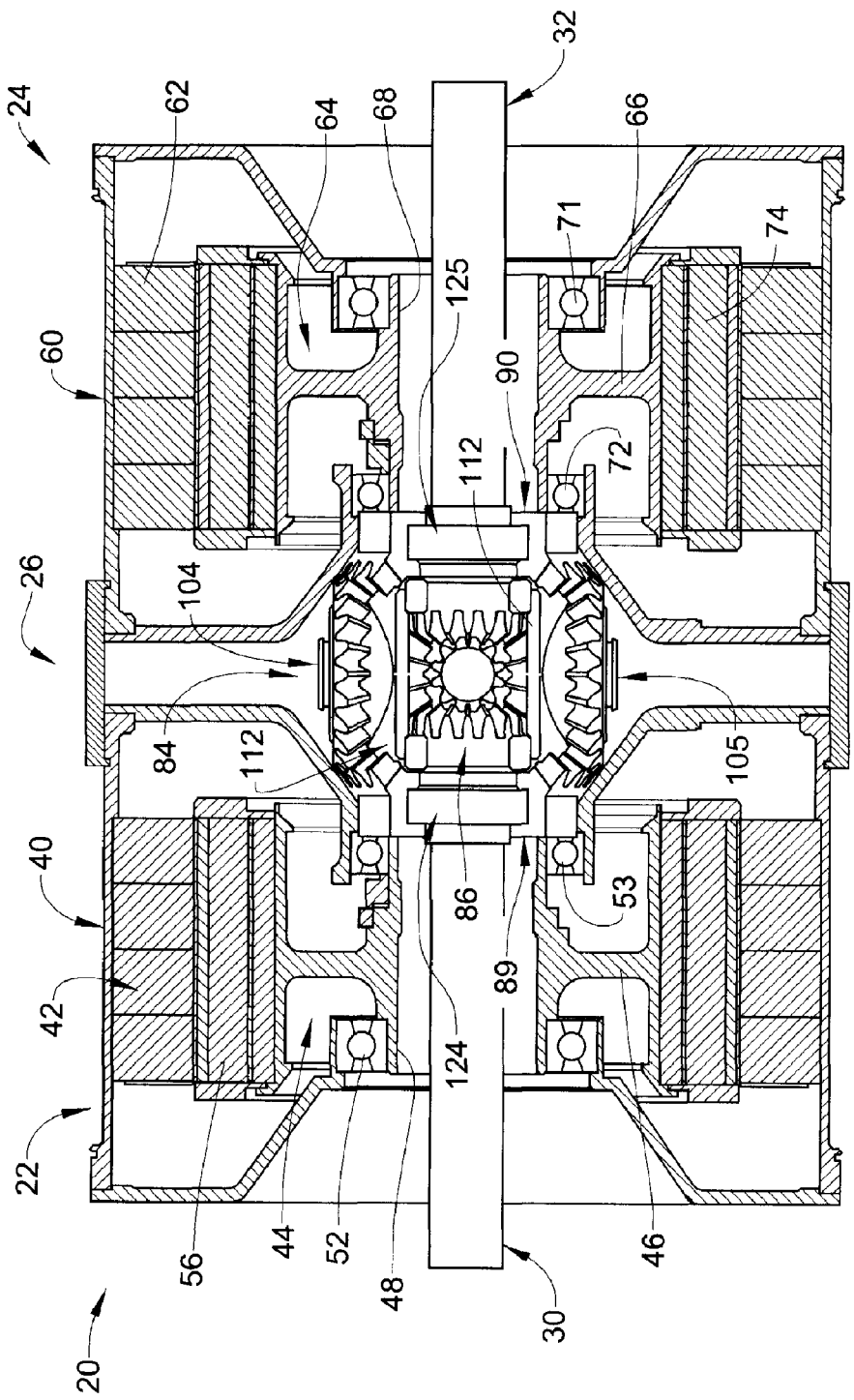
FIG. 2 depicts a cross-sectional view of the asynchronous boost assist system of FIG. 1 including a first electric motor coupled to a second electric motor through a dual differential system.

As shown in FIG. 2, first electric motor 22 includes a first housing 40 within which is arranged a stator 42 and a rotor 44. Rotor 44 includes a hub 46 having a central opening 48. Rotor 44 is rotatably mounted relative to stator 42 through first and second bearings 52 and 53 supported within first housing 40. Rotor 44 is also shown to include a plurality of laminations 56. Application of an electrical current to stator 42 creates a magnetic field that causes rotor 44 to rotate. Similarly, second electric motor 24 includes a second housing 60 within which is arranged a stator 62 and a rotor 64. Rotor 64 includes a hub 66 having a central opening 68. Rotor 64 is rotatably mounted relative to stator 62 through first and second bearings 71 and 72 supported within second housing 60. Rotor 64 is also shown to include a plurality of laminations 74. Rotors 44 and 64 are operatively connected to differential gear system 26 as will be detailed more fully below.

Figure 3:
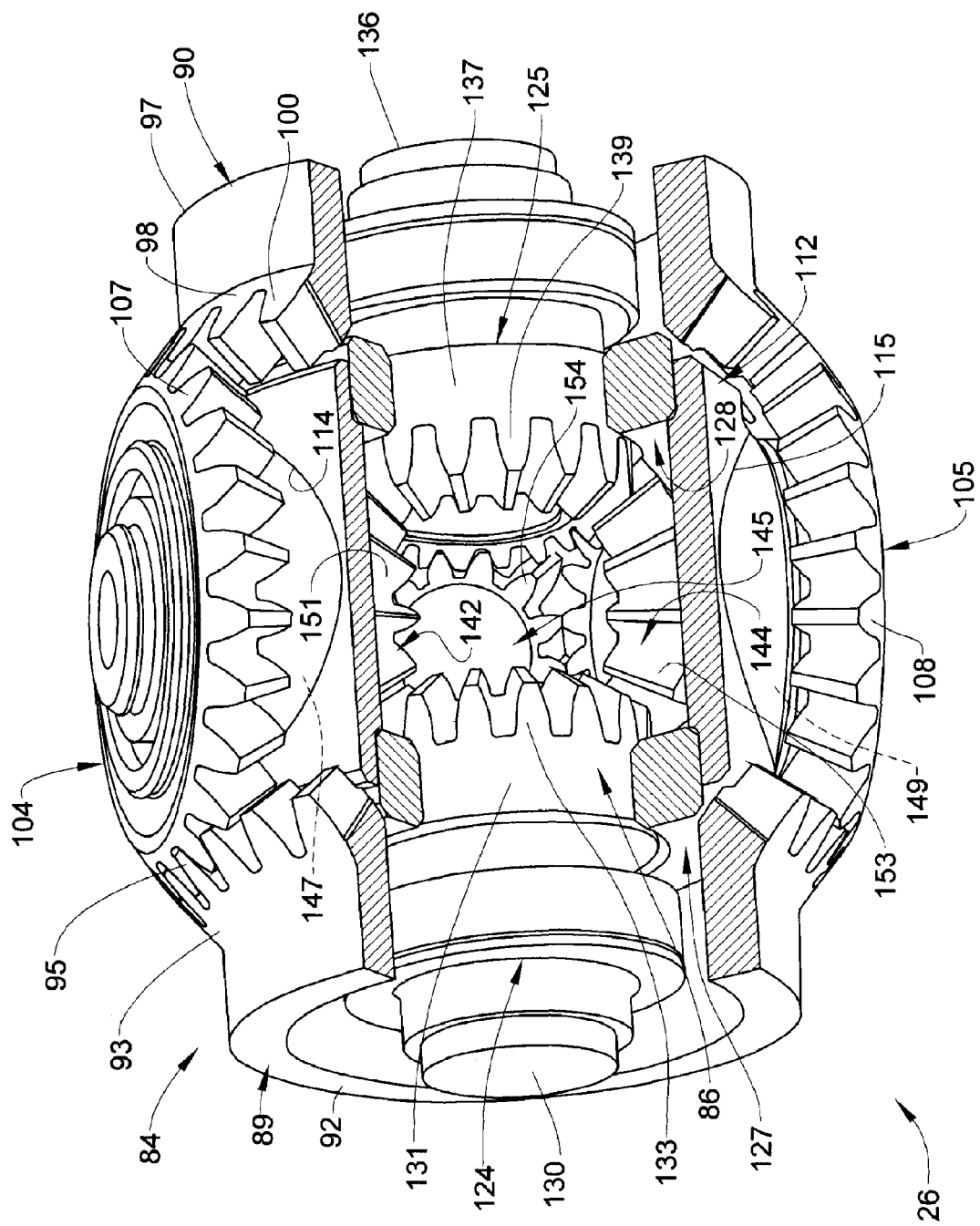
FIG. 3 depicts a partial perspective view of the dual differential system of FIG. 2.

In accordance with the exemplary embodiment illustrated in FIG. 3, differential gear system 26 constitutes a dual differential gear system including a first differential gear set 84 disposed about a second differential gear set 86. First differential gear set 84 includes a first input member 89 coupled to rotor 44 and a second, opposing input member 90 coupled to rotor 64. First input member 89 includes a first end 92 coupled to rotor 44 and a second end 93. Second end 93 includes a plurality of gear teeth 95. Second input member 90 includes a first end 97 operatively coupled to rotor 64 and a second end 98. Second end 98 includes a plurality of gear teeth 100. First input member 89 is mechanically linked to second input member 90 through first and second opposing planet gears 104 and 105 each having a corresponding plurality of gear teeth 107 and 108 respectively. More specifically, gear teeth 95 on input member 89 and gear teeth 100 on input member 90 mesh with gear teeth 107 and 108 on planet gears 104 and 105. First and second planet gears 104 and 105 are mounted to a carrier 112 having a plurality of planet gear receiving members, two of which are shown at 114 and 115. As will be detailed more fully below, rotation of first and second input members 89 and 90 is transferred to first and second planet gears 104 and 105 which, in turn is passed to carrier 112.

Second differential gear set 86 includes a first output member 124 and a second, opposing output member 125. Output members 124 and 125 are supported within carrier 112 through first and second bearings 127 and 128. First output member 124 includes a first end portion 130 that is operatively coupled to first front wheel 6 though first drive shaft 30, and a second end portion 131 having a plurality of gear teeth 133. Similarly, second output member 125 includes a first end portion 136 that is operatively coupled to second front wheel 8 through second driveshaft 32, and a second end portion 137 provided with gear teeth 139. First and second output members are mechanically linked to a plurality of planet gears 142-145 (see also FIG. 9) carried within carrier 112. Each planet gear 142-145 includes a corresponding first end section 147-150 (See also FIGS. 8-10) rotatably mounted to carrier 112 in planet gear receiving portions 114 and 115, as well as additional planet gear receiving portions (not shown) and a corresponding second or geared end portion 151-155 that are configured to engage with gear teeth 133 and 139 on first and second output members 124 and 125 respectively.

Figure 4:
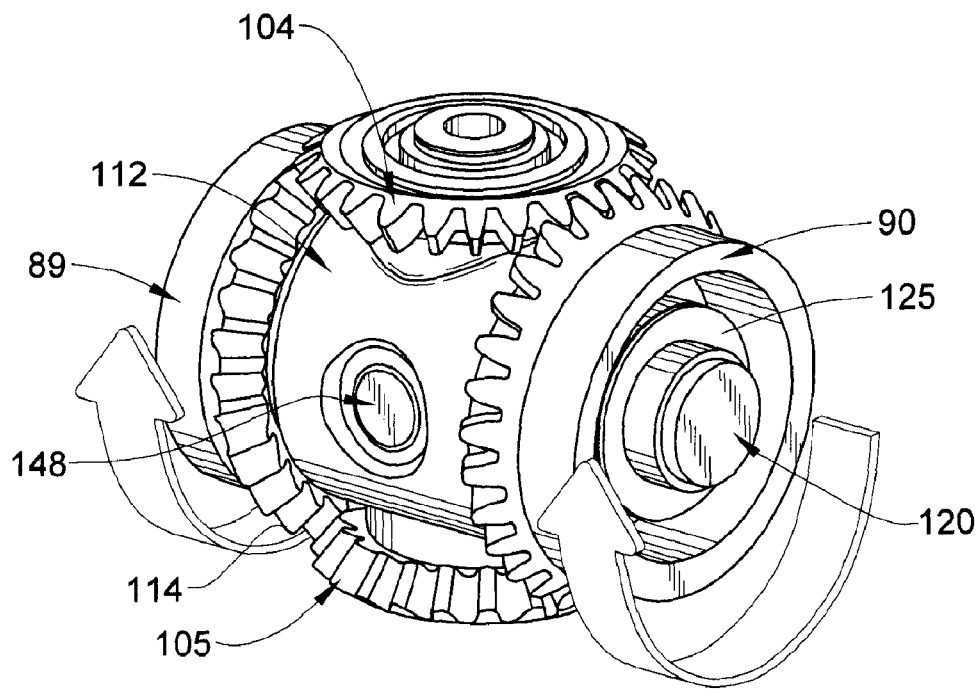
FIG. 4 depicts the dual differential system of FIG. 3 illustrating input rotation to first and second input members.
Figure 5:
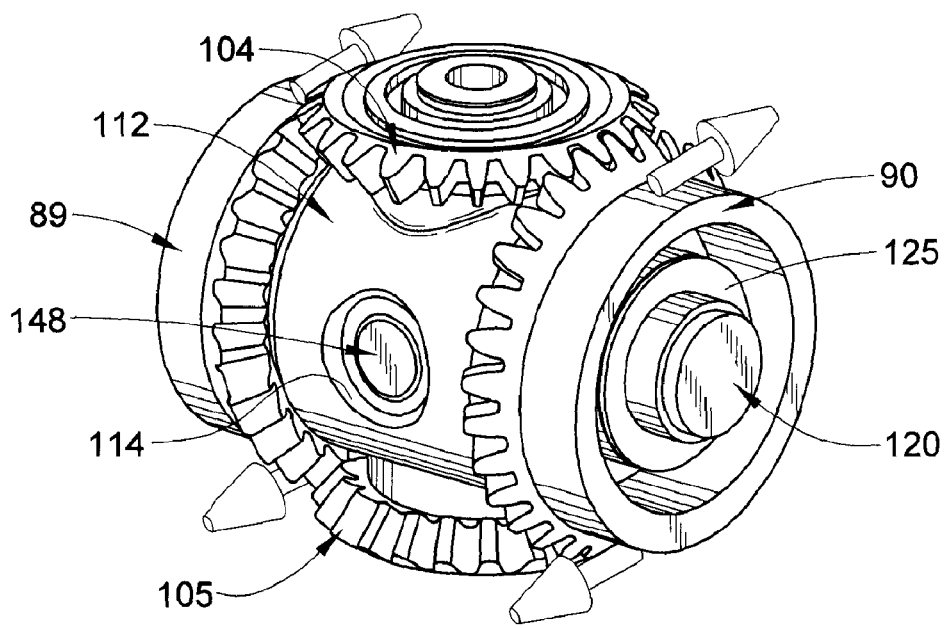
FIG. 5 depicts a transfer of rotational energy from the first and second input members to first and second planet gears of a first differential gear set of the dual differential system of FIG. 4.
Figure 6:
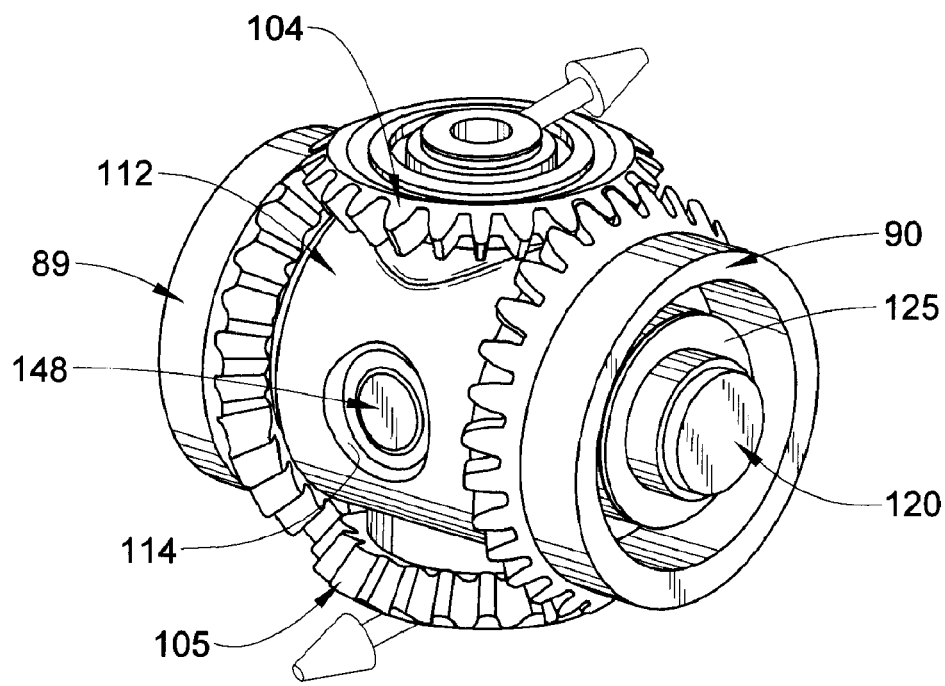
FIG. 6 depicts a transfer or rotational energy from the first and second planet gears of the first differential gear set to a carrier of the first differential gear set.
Figure 7:
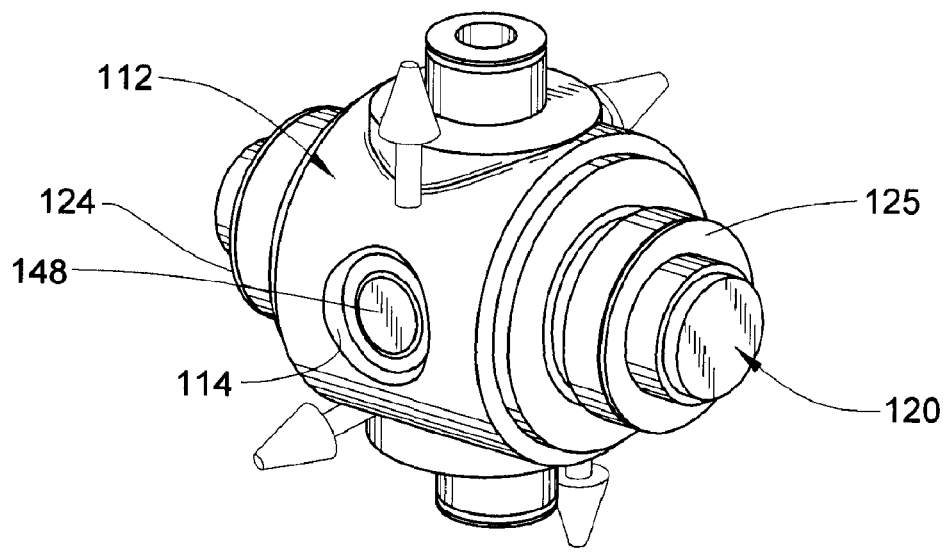
FIG. 7 depicts rotation of the carrier of the first differential gear set with the first and second planet gears being removed.
Figure 8:
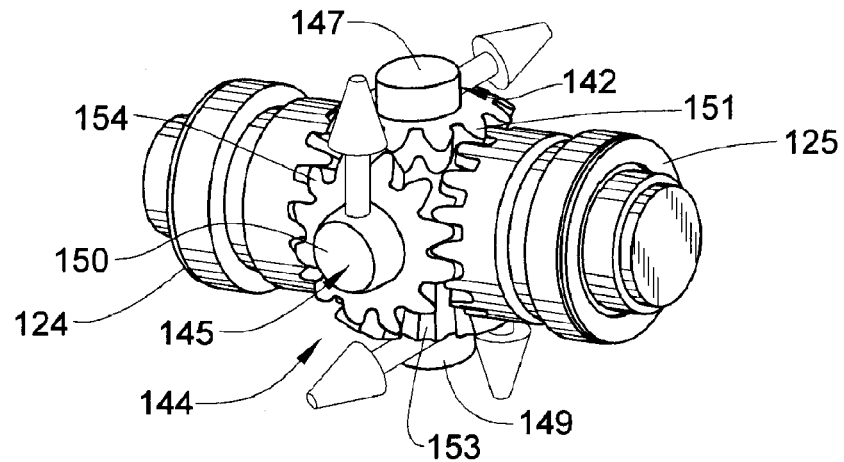
FIG. 8 depicts a transfer or rotational energy from the carrier to a plurality of planet gears of a second differential gear set of the dual differential system of FIG. 4.
Figure 9:
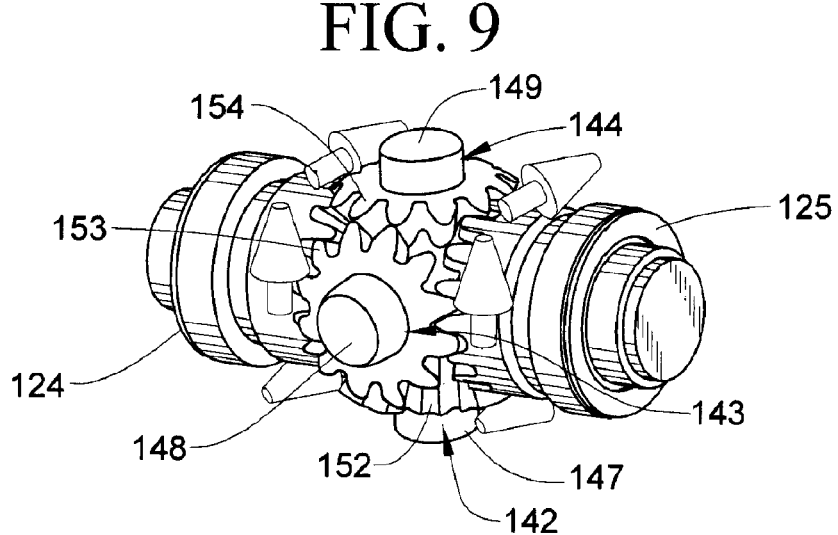
FIG. 9 depicts a transfer of rotational energy from the plurality of planet gears of the second differential gear set to first and second output members.
Figure 10:
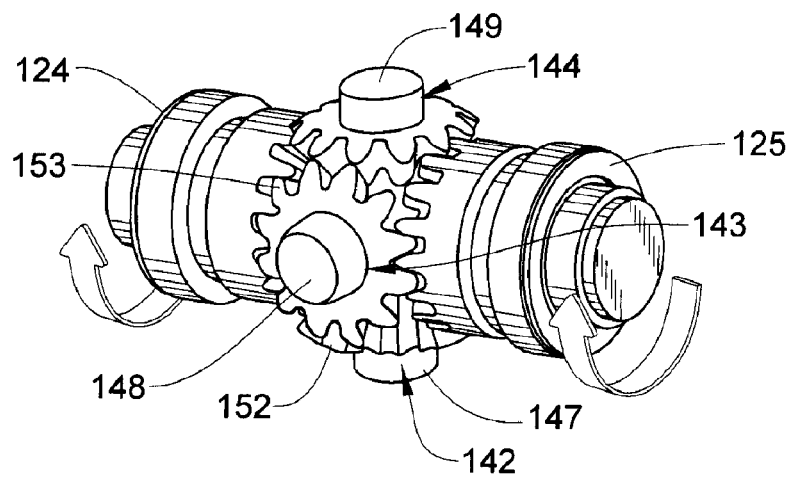
FIG. 10 depicts rotational energy output at the first and second output members.

Reference will now follow to FIGS. 4-10 in describing energy transfer through differential gear system 26. As shown in FIG. 4 first and second electric motors impart rotational energy into first and second input members 89 and 90. In the exemplary embodiment shown, the direction of rotational energy input to first input member 89 is similar to the direction of rotational energy input to second input member 90. However, as will be detailed more fully below, the direction of rotational energy input to one of first and second input members 89 and 90 can differ from the direction of rotational energy input to the other of first and second input members 89 and 90. The rotational energy flows from first and second input members 89 and 90 into first and second planet gears 104 and 105 as shown in FIG. 5. The walking of first and second planet gears 104 and 105 leads to a corresponding rotation of carrier 112 as shown in FIGS. 6 and 7. The rotation of carrier 112 is passed to planet gears 142-145 as shown in FIG. 8. The rotation of planet gears 142-145 is passed through engagement of gear teeth 151-155 with gear teeth 133 and 139 on first and second output members as shown in FIG. 9. At this point the rotational energy is passed through first and second output members 124 and 125 as shown in FIG. 10.

Figure 11:
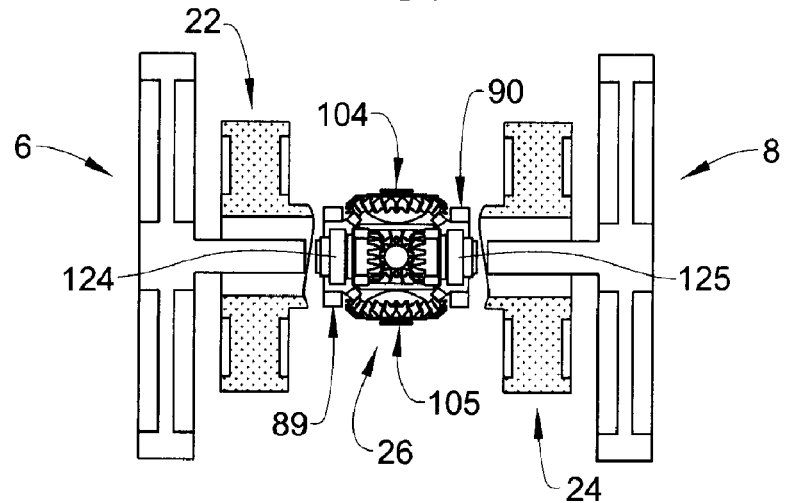
FIG. 11 depicts that first and second electric motors at rest.
Figure 12:
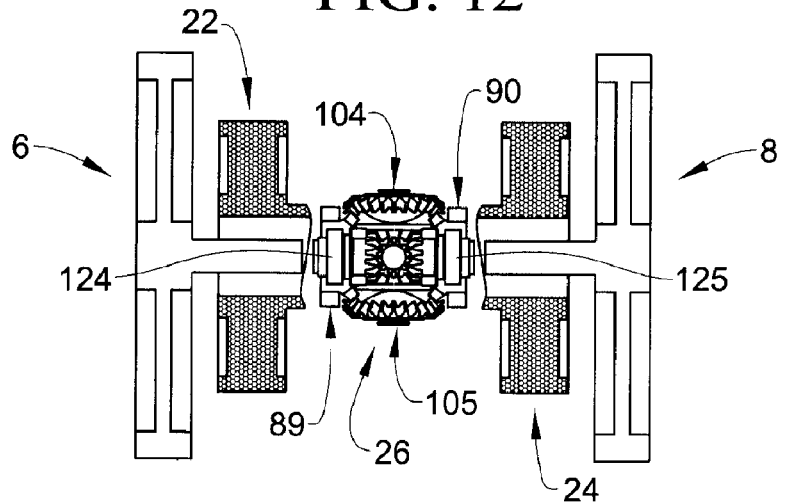
FIG. 12 depicts the first electric motor operating at full speed in a first direction and the second electric motor operated at full speed in a second, opposite direction with the motor vehicle being in a non-moving configuration.
Figure 13:
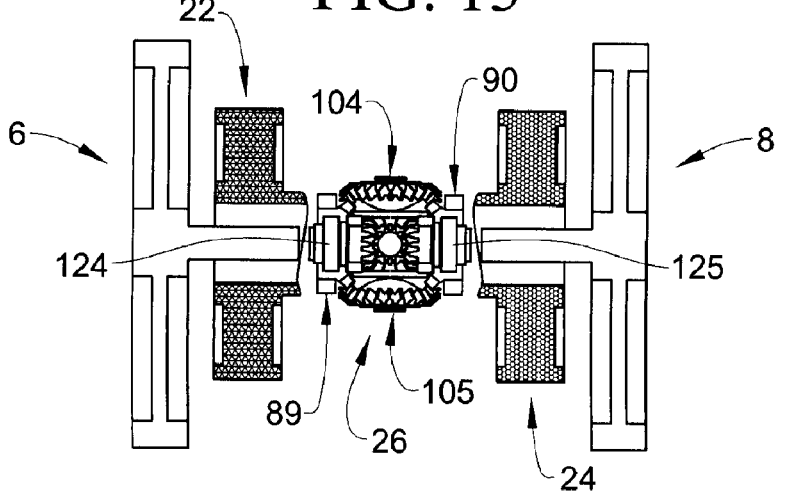
FIG. 13 depicts a reduction in speed of the first electric motor and no change in speed of the second electric motor to initiate movement of the vehicle.

Reference will now be made to FIGS. 11-16 in describing an exemplary operation of asynchronous boost assist system 20. Initially, first and second electric motors 22 and 24 are at rest as shown in FIG. 11. Electric motors 22 and 24 typically are in a rest state when motor vehicle 2 is parked. Passing from rest to initial movement is initiated with controller 38 signaling first and second electric motors 22 and 24 to operate at full speed in opposite directions such as shown in FIG. 12. More specifically, when motor vehicle is started, or at rest such as standing at a light or the like, first electric motor 22 operates at full speed in a first direction and second electric motor 24 operates at full speed in a second, opposing direction direction. At this stage, motor vehicle 2 remains motionless. As such, electric motors 22 and 24 can be employed to store electrical energy in energy storage system 38 for charging batteries and the like. Movement of motor vehicle 2 is initiated when controller 38 senses an acceleration demand through input sensor 35. At this point, controller 38 signals first electric motor 22 to gradually reduce speed to create a rotational imbalance at differential gear system 26 as indicated in FIG. 13. The rotational imbalance creates a torque that initiates movement.

First electric motor 22 continues to slow until coming to a stop as indicated in FIG. 14. At this point, motor vehicle 2 continues to build speed. After coming to a stop, controller 38 signals first electric motor 22 to rotate in the second direction, as shown in FIG. 15, to further accelerate motor vehicle 2. At cruising speed, controller 38, in response to, for example inputs received from input sensor 36 signals first electric motor 22 to operate at a first speed in the second direction, and second electric motor 24 to slow to a corresponding first speed in the second direction creating a rotational balance at differential gear system 20 as shown in FIG. 16. During breaking, controller 38 signals first electric motor 22 to slow to a stop, and then accelerate to full speed in the first direction, while simultaneously signaling second electric motor 24 to accelerate to full speed in the second direction. With this arrangement, asynchronous boost assist system 20 provides added power to allow motor vehicle 2 to quickly accelerate from a stop to a cruising speed. In addition, at cruising speed, asynchronous boost assist system 20 provides added power as needed for passing by increasing, for example, the speed of second electric motor 24. Furthermore, by operating first and second electric motors in opposite directions such as during breaking and or at a stop, asynchronous boost assist system 20 can be employed to charge on board vehicle batteries.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An asynchronous boost assist system for a motor vehicle, the boost assist system comprising:
   a first electric motor;
   a second electric motor positioned opposite the first electric motor;
   a differential gear system operatively connected to the first and second electric motors, the differential gear system including a first differential gear set and a second differential gear set, the first differential gear set being operatively connected to the first and second electric motors and the second differential gear set being configured and disposed to operatively connect to first and second vehicle wheels, the first differential gear set enveloping the second differential gear set; and
   a controller operatively connected to each of the first and second electric motors, the controller selectively independently controls an operational speed of each of the first and second electric motors to selectively provide an acceleration boost through the second differential gear set.

2. The boost assist system according to claim 1, wherein the first electric motor includes a first rotor and the second electric motor includes a second rotor, each of the first and second rotors being operatively connected to the first differential gear set.

3. The boost assist system according to claim 2, wherein the first differential gear set includes a first input member coupled directly to the first rotor, and a second input member coupled directly to the second rotor.

4. The boost assist system according to claim 2, further comprising: a first drive shaft extending from the second differential gear set through the first rotor, and a second drive shaft extending from the second differential gear set through the second rotor.

5. The boost assist system according to claim 1, wherein the differential gear system comprises a dual differential gear system with the first and second differential gear sets being disposed in a common housing.

6. A vehicle comprising:
   a chassis;
   a plurality of wheels mounted to the chassis, the plurality of wheels including first and second front vehicle wheels and first and second rear vehicle wheels; and
   an asynchronous boost assist system mounted in the chassis, the boost system including:
   a first electric motor;
   a second electric motor positioned opposite the first electric motor;
   a differential gear system operatively connected to the first and second electric motors, the differential gear system including a first differential gear set operatively coupled to the first and second electric motors and a second differential gear set operatively connected to one of the first and second front vehicle wheels and the first and second rear vehicle wheels, the first differential gear set enveloping the second differential gear set; and
   a controller operatively connected to each of the first and second electric motors, the controller selectively independently controls an operational speed of each of the first and second electric motors to selectively provide an acceleration boost through the second differential gear set.

7. The vehicle according to claim 6, wherein the first electric motor includes a first rotor and the second electric motor includes a second rotor, each of the first and second rotors being operatively connected to the first differential gear set.

8. The vehicle according to claim 7, wherein the first differential gear set includes a first input member coupled directly to the first rotor, and a second input member coupled directly to the second rotor.

9. The vehicle according to claim 7, further comprising: a first drive shaft extending from the second differential gear set through the first rotor to the one of the first front vehicle wheel and the first rear vehicle wheel, and a second drive shaft extending from the second differential gear set through the second rotor to the one of the second front vehicle wheel and the second rear vehicle wheel.

10. The vehicle according to claim 7, wherein the differential gear system comprises a dual differential gear system with the first and second differential gear sets being disposed in a common housing.

11. A method of operating a boost assist system for a vehicle, the method comprising:
    signaling a first electric motor to rotate in a first direction at a first operational speed;
    signaling a second electric motor, operatively connected to the first electric motor through a differential gear set, to rotate in a second direction at the first operational speed; and
    reducing the first operational speed of the first electric motor to initiate forward movement of a vehicle.

12. The method of claim 11, further comprising: reducing the first operational speed of the first electric motor to a zero speed.

13. The method of claim 12, further comprising: signaling the first electric motor to rotate in the second direction at another operational speed.

14. The method of claim 13, further comprising: increasing the another operational speed to a cruising speed and decreasing the first operational speed of the second electric motor to the cruising speed.

15. The method of claim 14, further comprising: reducing rotation of the first electric motor from the cruising speed to the zero speed to slow the vehicle.

16. The method of claim 15, further comprising: increasing rotation of the first electric motor from the zero speed in the first direction.

17. The method of claim 15, further comprising: generating electrical energy at the first electric motor.

18. The method of claim 17, further comprising: storing the electrical energy in an energy storage device in the vehicle.

* * * * *